United States Patent
Sevcik

(10) Patent No.: US 6,667,969 B1
(45) Date of Patent: Dec. 23, 2003

(54) NETWORK SERVICE CONTROL POINT (SCP) FOR AN INTELLIGENT NETWORK (IN)

(75) Inventor: Maximilian Sevcik, Paris (FR)

(73) Assignee: Siemens Atkienegesellschaft, Munich (DE)

( * ) Notice: Subject to any disclaimer, the term of this patent is extended or adjusted under 35 U.S.C. 154(b) by 0 days.

(21) Appl. No.: 09/381,220

(22) PCT Filed: Mar. 17, 1998

(86) PCT No.: PCT/EP98/01523

§ 371 (c)(1),
(2), (4) Date: Sep. 16, 1999

(87) PCT Pub. No.: WO98/42147

PCT Pub. Date: Sep. 24, 1998

(30) Foreign Application Priority Data

Mar. 19, 1997 (EP) ............................................. 97104704

(51) Int. Cl.[7] .............................................. H04L 12/66
(52) U.S. Cl. ...................... 370/352; 370/465; 370/410; 370/522; 379/201
(58) Field of Search ................................. 370/465, 466, 370/410, 522, 352; 379/201

(56) References Cited

U.S. PATENT DOCUMENTS

| | | | | |
|---|---|---|---|---|
| 5,241,588 A | * | 8/1993 | Babson | ........................ 379/201 |
| 5,915,008 A | * | 6/1999 | Dulman | ........................ 379/201 |

FOREIGN PATENT DOCUMENTS

| | | | | |
|---|---|---|---|---|
| EP | WO 95/295564 | * | 11/1995 | ............. H04Q/3/00 |
| EP | 0 722 257 A2 | | 7/1996 | |
| WO | WO 95/29564 | | 11/1995 | |
| WO | WO 96/21310 | | 7/1996 | |

OTHER PUBLICATIONS

Bosco, P.G. , et al, "A Laboratory for AIN Service Design and Validation", disclovering a New World of Communications, Chicago, IEEE, Vol 2 of 4 Jun. 1992, pp 566–571.*
Ramarao, B.C.V., Role of Application GatewaysGlobal Intelligent Network, Intelligent Networks:The Path to Global Networking, Processings of the Internation Council for Computer Communication Intelligent Networks conference, May 4–6, 1992, pp 358–367.*
Ebert, I., et al., "Applicatin of a Service–Independent Architecture", Innovations in Switching Technology, Stockholm, IEE, Vol 4, May 1990, pp 57–62.*
Sevcik, M. Luder R., "Customers in Driver's Seat: Private Intelligent Network Control Point", siemens AG, germany (1995) pp 1–4.*
Fujinaga, Masahiko, et al., "Implementing in Functional Entities on top of Distributed Operating System", Proceedings of the International Switching Symposium, Yokohama, vol. 1, Oct. 25, 1992, pp. 268–272.
Bosco, P. G., et al., "A Laboratory for AIN Service Design and Validation", Discovering a New World of Communications, Chicago, IEEE, Vol 2 of 4, Jun. 14, 1992, pp. 566–571.
Ebert, I., et al., "Application of a Service–Independent Architecture", Innovations in Switching Technology, Stockholm, IEEE, Vol 4, May 1990, pp. 57–62.

(List continued on next page.)

*Primary Examiner*—Douglas Olms
*Assistant Examiner*—Robert W. Wilson
(74) *Attorney, Agent, or Firm*—McCormick, Paulding & Huber LLP

(57) ABSTRACT

A networking architecture allows the owner of a private service control point to collaborate with existing service applications of a network SCP.

11 Claims, 3 Drawing Sheets

OTHER PUBLICATIONS

Ramarao, B. C. V., Role of Application Gateways in a Global Intelligent Network, Intelligent Networks: The Path to Global Networking, Proceedings of the International Council for Computer Communication Intelligent Networks Conference, Tampa, May 4–6, 1992, pp. 358–367.

Niitsu, Y. et al., "Design of an Integrated Service Creation Environment for the Advanced Intelligent Network", IEEE Global Telecommunications Conference, Singapore, vol. 2, Nov. 14, 1995, pp. 1277–1281.

Uchiyama, S., et al., "An Environment for Supplementary Service Development", World Telecommunications Congress. (International Switching Symposium), Advanced Switching Technologies for Universal Telecommunications at the Beginning of the $21^{st}$ Century, Berlin, Vol 1, Apr. 23, 1995, pp. 88–92.

Lüder, R., Sevcik, M., "Customers in Driver's Seat: Private Intelligent Network Control Point", Siemens AG, Germany (1995) pp. 1–4.

* cited by examiner

NETWORK SERVICE CONTROL POINT (SCP) FOR AN INTELLIGENT NETWORK (IN)

FIELD OF THE INVENTION

The present invention relates to allowing the collaboration of private service control points with existing service application of a network service control point in an intelligent network.

BACKGROUND OF THE INVENTION

The intelligent network (IN) is a known network architecture for offering telecommunication services for architectures such as PSTN/ISDN.

The intelligent network is intended to make it possible for a network operator to quickly and reliably introduce new services without having to intervene in the system program systems in each related network node.

In an IN, such interventions limited to an optimally few central network nodes, which are referred to as service control points (SCPs). These SCPs are equipped at a central location with the corresponding application software for. The new services, which are referred to as the service applications. The individual network nodes in the base network are fashioned as a "remote control" to implement the new services. The SCP of a network operator (public or private) is referred to below as network SCP.

A standardized model of the call processing of a remotely controlled network node is employed in order to assure the collaboration between SCP and network nodes of various manufacturers, so that an IN application of SCP has the same effect on a call in every network node, independent of the network nodes manufacturer. The structure of this call model is presented in the document, Ebert, I. et al., "Application of a Service-Independent Architecture, Innovations in Switching Technology", Stockholm, May 28–Jun. 1, 1990, Vol. 4, May 28, 1990, pages 57–62, XP0001 30898, Institute of Electrical and Electronics Engineers.

These remote control network nodes of the IN are also referred to as service access nodes or service switching points SSP. They are connected to a service control point SCP either directly or via a signaling network.

A service management point SW serves the purpose of administering the IN services by the network operator, the network vendor and the service subscriber.

Network operators or network vendors are interested in defining new services or developing existing services. A service creation environment (SCE) is used for this purpose. The job of the SCE is comprised in to introduce service data and service logic (programs) into the SCPs and SMPs without existing service applications, or the base network being affected in terms of their functionality and integrity.

The document Uchiyama, S. et al., "An Environment for Supplementary Service Development", ISS.'95, World Telecommunications Congress (International Switching Symposium), Advanced Switching Technologies for Universal Telecommunications at the beginning of the 2161 Century Berlin, Apr. 23–28, 1995, Vol. 1, Apr. 23, 1995, pages 88–92, XP000495543, Verband Deutscher Electrotechniker (VDE), discloses an exemplary environment for the development of supplementary services, in which a developer can program a service on a highly abstract level without the functionality and integrity of existing service applications being affected by the introduction of this new service.

In the document Masahiko Fujinaga, et al., "Implementing in Functional Entities on top of Distributed Operating System October 1992, Vol. 1, pages 268–272, XP000337657, Institute of Electronics: Information and communication Engineers, the programming of a service is abstracted by defined function modules, which are referred to as service independent building blocks (SIB), and and is simultaneously limited to these modules for security reasons.

The state of SCE technology is thus limited to the modification of existing service applications in the functions provided precisely for the purpose of service customization or to the setup of new services composed of function modules with functions that are precisely defined by the manufacturer in SIBs. In both instances, only versions of the services or service functions defined by the manufacturer are generated.

Truly new service functions can not be developed by those (especially the service vendor), who have no access to the functions in the base network or the SCP/SMP. One cannot open a SCP/SMP for developing services by third parties because of the enormous security problems and side-effects on existing services.

In order to govern the problems of previous service creations environments, the known technique of "private" SCP, i.e. SCPs that belong to a private service vendor or even to a customer who uses his own service was developed. The services developed by third parties are thereby implemented in a physically separate, private SCP connected to the network SCP, whereby the centralized network SCP implements the necessary security functions (gateways).

This technology is known from the document "Customers in Driver's Seat: Private Intelligent Network Control Point", by R. Luider and M. Sevcik (Lüder).

An IN architecture according to Lutder is expanded by the connection of private SCPs, with the critical expansions relate to the following components:

1) Each service vendor develops his services in a private SCP computer node.
2) The private SCPs are connected to the network SCP via a secure data communication network (wide area network: WAN). The WAN is based on known industrial standards such as the Internet protocols (IP).
3) The protocol messages are exchanged with the base network via a secure gateway GW in the network SCP. The protocols' applications partts are known and correspond to the international standards such as INAP, AIN or corresponding sub-sets thereof The gateway GW prevents effor-affected messages or unallowed functions from influencing the base network. The owners (network operators) of the network SCP can, for example, define what network functions (such as, INAP operations) are released for the private SCPs. A specific, sensitive network function (such as fee charging), if not released, cannot be used by a private SCP.

Due to these expansions, the service vendor, as owner of a private SCP, is thus free in terms of designing his services and service data.

The disadvantage is that no interworking is possible with the existing service applications in the network SCP. Such internetworking would be extremely useful and cost-saving since many service functions from the existing service applications can also be employed without further effort for the services in the private SCP of a service vendor. Some examples include routing, fee charging, control of an intelligent peripheral (for announcements, etc.), etc.

SUMMARY OF THE INVENTION

The present invention is based on the object of overcoming limitations on interworking with existing service applications in the network SCP.

The advantage of the invention lies in the possibility of using existing applications of the network SCP by private SCPs or, respectively, the service creation environment of the private SCP.

An embodiment of the invention where collaboration is requested by the private SCP to the network SCP with respect to a service application, and the network SCP returns references (PIC return data) to specific locations of the service application which are then called by the private SCP, has the advantage that the operational dynamics are improved, since the private SCP need not employ any logical address for the call of the network SCP.

DESCRIPTION OF THE PREFERRED EMBODIMENTS

Figure 1:
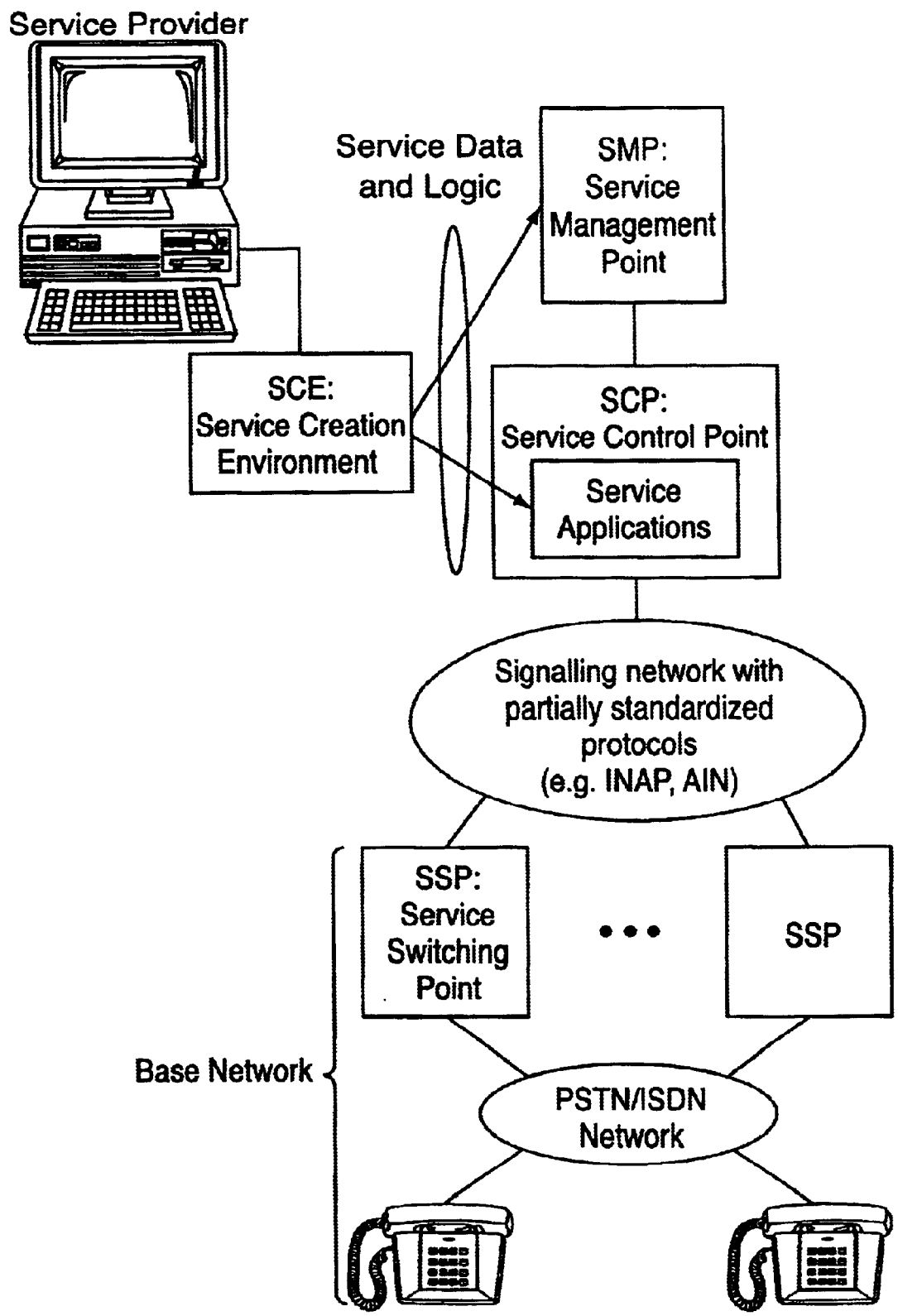
FIG. 1 is a block diagram showing a known IN architecture.
Figure 2:
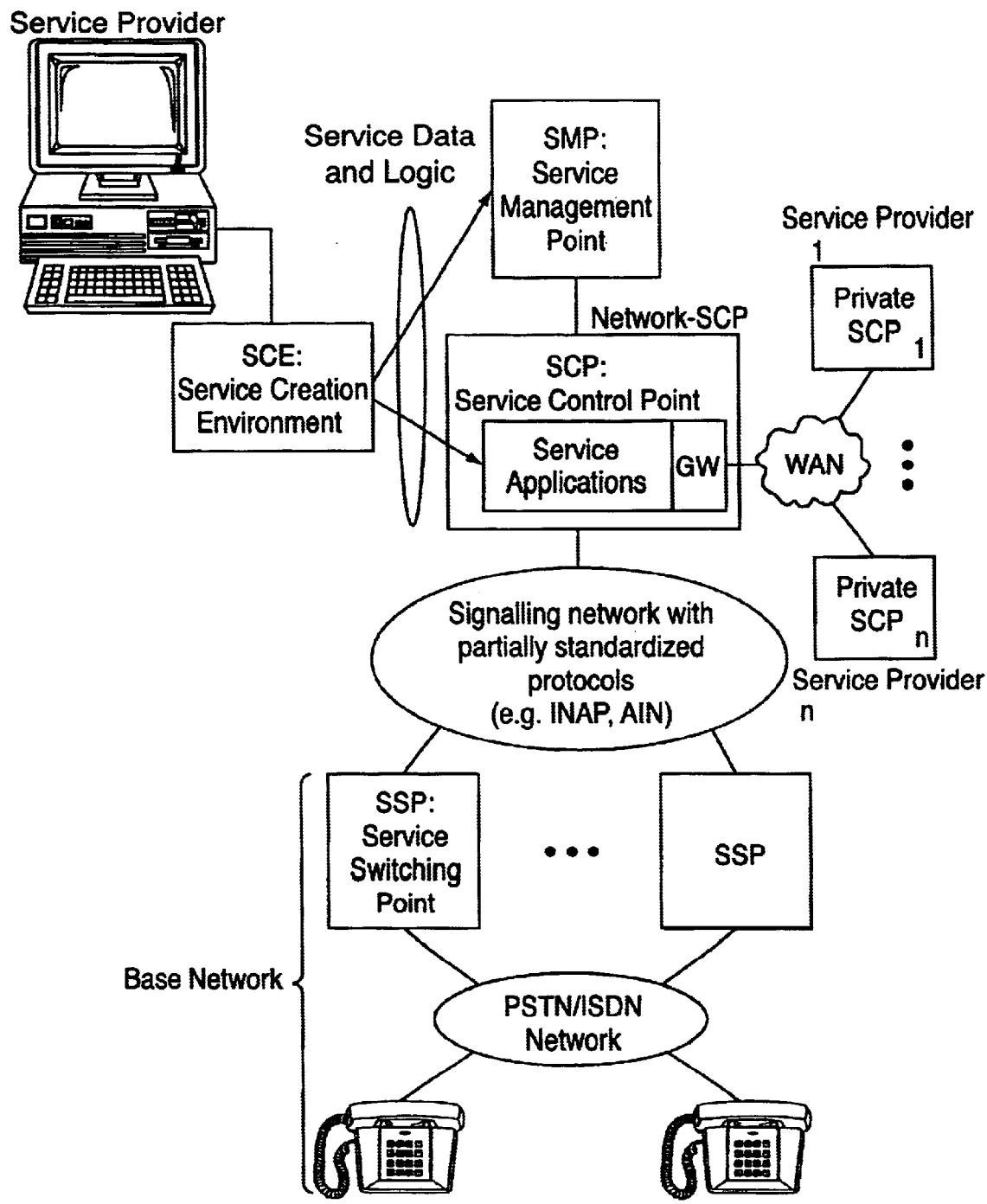
FIG. 2 is a block diagram showing an IN architecture expanded by the connection of the private SCPs.

An exemplary embodiment of the invention is described below with reference to FIG. 2.

First, a service vendor can develop arbitrary services in his private SCP as with the assistance of the SCE, these services making use of the INAP, AIN protocol sub-set defined by the gateway GW. The security of the base network is thereby preserved.

In addition, a service vendor can now utilize existing, individual service functions in the service applications in the network SCP (see FIG. 2) in his private SCP, and can modify these or, respectively, replace them with his own functions developed in the private SCP, resulting in an advantageous collaboration of the private SCP with the network SCP.

This advantageous collaboration can be realized as follows:

The service applications in the network SCP are logically divided into isolated function blocks that respectively represent a service function as seen from the point of view of the private SCR Points in call, (PIC) are defined between the function blocks allowing, a service function to be called within a private SCP.

Figure 3:
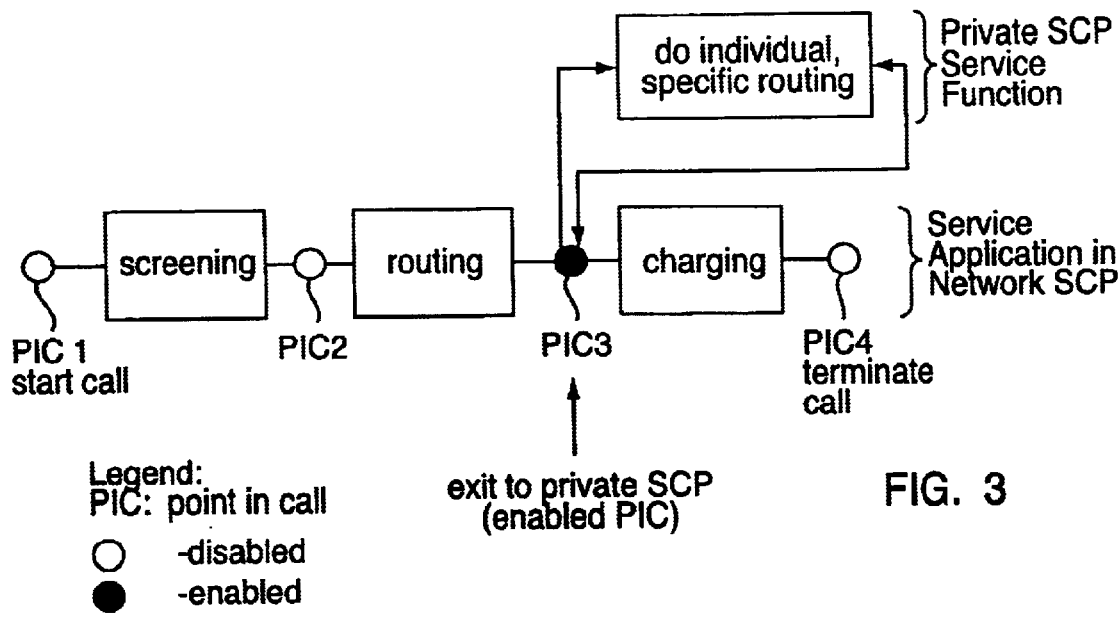
FIG. 3 is a block diagram illustrating collaboration of the private SCP with the network SCP with assistance of function blocks and PICs, with a function lying between two PICs being supplemented by a service function in the private SCP.
Figure 4:
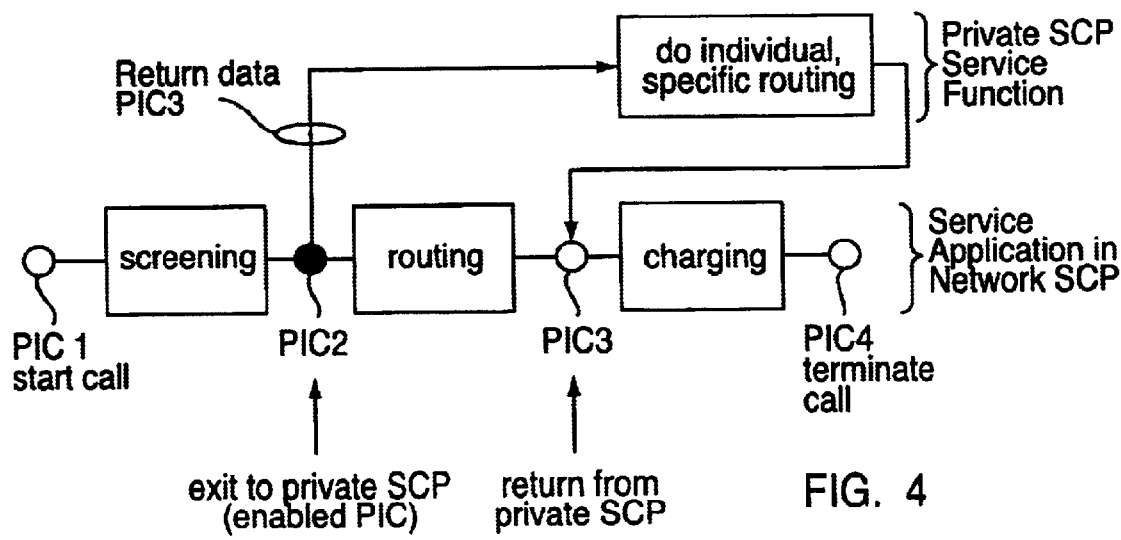
FIG. 4 is a block diagram also illustrating collaboration of the private SCP with the network SCP with assistance of function blocks and PICs, with a function lying between two PICs being completely replaced by a service function in the private SCP.

FIGS. 3 and 4 show the principle of the collaboration of the private SCP with the network SCP with the assistance of function blocks and PICs:

In the illustrated examples, there is a service application in the network SCP composed of three function blocks (screening, routing, charging) and four points in call (PIC 1–4) which allow the exit into a service function in the private SCP.

Each PIC can be "disabled" or "enabled" independently of the other PICs. With a disabled PIC, the control switches from one function block directly to another in the same service application. With an enabled PIC, a function is called in the private SCP (possibly, via known methods such as remote procedure call).

Specific data of the service application are allocated to each PIC, which correspond to the current status of the call handling (for example, the source area and the selected route in the network SCP in the example in FIG. 3). The gateway GW (see FIG. 2) guarantees the integrity of these calls and their data.

The PICs in the network SCP can be set "disabled" or "enabled" arbitrarily for each service vendor by service parameterization (customization) in the service creation environment (SCE), corresponding to the service functions to be handled in the respective private SCP. The setting of the PICs affects entries into the corresponding registration area (for example, the service application register) of the network SCP.

The supplier of the service applications (manufacturer of the network elements, SCP, etc.) tests all service applications with all meaningful combinations of PICs and the corresponding gateway GW functions, assuring the integrity of the base network and of the service applications.

In his private SCP, the service vendor can arbitrarily link the handling of a service function with its specific data, data management functions or program software. A customer data base with purchase preferences of the calling customer in the routing example in FIG. 3 can be utilized as the basis for the selection of a route for a service representative specializing in this customer.

In FIG. 3, a function (here the function of routing between PIC2 and PIC3) lying between two PICs is supplemented by a service function in the private SCP.

In FIG. 4, a function (here the routing function between PIC2 and PIC3) lying between two PICs is completely replaced by a service function in the private SCP. To accomplish this, the PIC return data to the next PIC are indicated at the private service function in an enabled PIC (PIC2 here).

The invention offers the following advantages:
1) The network operator can offer an application to the service vendors (his customers) without risk via the network SCP (i.e., there is no deterioration of the base network), which is capable of being individually expanded or modified via the private SCP of the service vendor.
2) Service vendors can quickly expand and selectively offer service applications or completely newly service functions without having to completely newly develop completely new complex service applications. The service functions can be combined with other DP applications of the service vendor.
3) There is a low testing outlay since the service applications are pre-tested by the supplier, as well as a fast commissioning of specific service functions.

I claim:

1. A network node device which is a network SCP of an IN network, comprising:
   offered service applications in said IN network,
   a connection to a private SCP selected from the group consisting of a service vendor and a service consumer via a further network,
   a private SCP collaboration routine that collaborates with said private SCP in such a way that said network SCP aborts the processing of a call for a service application at specific locations in order to call said private SCP; and/or in that it allows itself to be called by a private SCP at specific locations in order to continue the processing of a service applications.

2. A network node device which is a network SCP according to claim 1, further comprising:

a modifiable registration store which holds service application information identifying which private SCP has requested collaboration with said network SCP at said service application and service application information identifying locations where said private SCP may be called by said network SCP.

3. A network node device which is a network SCP according to claim 1, further comprising:

a gateway that limits said private SCP, when implementing its service function, to only employing a selection from the group consisting of a protocol sub-set allowed in a first network and data of said service applications.

4. A network node device which is a network SCP according to claim 1 further comprising:

reference data comprising locations at which said private SCP may call said network SCP, said network SCP providing said reference data relating to a service application for a collaboration-requesting private SCP.

5. A network node device which is a network SCP of an IN network comprising:

offered service applications in said IN network, a connection to a private SCP selected from the group consisting of a service vendor and a service consumer via a further network, a collaboration routine that collaborates with said private SCP in such a way that said network SCP allows itself to be called by said private SCP at specific locations in order to continue the processing of service applications.

6. A network node device which is a network SCP according to claim 5, further comprising:

a modifiable registration store which holds service application information about which said private SCP has requested collaboration with said network SCP at said service application and at what locations said private SCP may be called by said network SCP.

7. A network node device which is a network SCP according to claim 5 further comprising:

reference data comprising locations at which said private SCP may call said network SCP, said network SCP providing said reference data relating to a service application for a collaboration-requesting private SCP.

8. A network node device which is a network SCP according to claim 5, further comprising:

a gateway that limits said private SCP, when implementing its service function, to only employing a selection from the group consisting of a protocol sub-set allowed in a first network and data of said service applications.

9. A method of collaborating between a private SCP and a network SCP comprising the steps of:

connecting said private SCP to said network SCP;

requesting collaboration by said private SCP with said network SCP with respect to a service application; and specifying specific locations of said service application to said network SCP at which said private SCP may be called.

10. A method of collaborating between a private SCP and a network SCP, comprising the steps of:

connecting said private SCP to said network SCP;

requesting collaboration by said private SCP with said network SCP with respect to a service application;

requesting references by said private SCP to specific locations of said service application;

receiving said references by said private SCP from said network SCP; and calling said network SCP at said specific locations from said private SCP.

11. A method of collaborating between a private SCP and a network SCP comprising the steps of:

connecting said private SCP to said network SCP;

requesting collaboration by said private SCP with said network SCP with respect to specific locations of a service application; and calling said network SCP at said specific locations for the processing of said service applications.

\* \* \* \* \*